Sept. 30, 1924.                              1,509,858
C. H. BOYLE
CORING DEVICE
Filed June 13, 1924

Inventor
C. H. Boyle,
By George G. Hall
Attorney

WITNESS:—
Chas. L. Griesbauer

Patented Sept. 30, 1924.

1,509,858

UNITED STATES PATENT OFFICE.

CHARLES H. BOYLE, OF NEW HAVEN, CONNECTICUT.

CORING DEVICE.

Application filed June 13, 1924. Serial No. 719,910.

*To all whom it may concern:*

Be it known that I, CHARLES H. BOYLE, a citizen of the United States, residing at New Haven, in the county of New Haven and State of Connecticut, have invented certain new and useful Improvements in Coring Devices, of which the following is a specification, reference being had therein to the accompanying drawings.

This invention relates to a new and improved coring device of the type used for coring and seeding grape-fruit and other fruit.

It is the object of this invention, among other things, to provide an article of this character with transverse cutting knives that operate entirely within the tubular cutter, and a non-collapsible platen against which pressure is applied to operate the tubular cutter and preferably so formed as to provide a receptacle for holding the core after its removal while the juices are being extracted therefrom; and in these and other ways produce a coring device that will be economical to construct, easy to manipulate and operate with efficiency.

To these, and other ends, my invention consists in the coring device, having certain details of construction and combinations of parts, as will be hereinafter described and more particularly pointed out in the claims.

Referring to the drawings, in which like numerals of reference designate like parts in the several figures.

Figures 1, 2, 3:
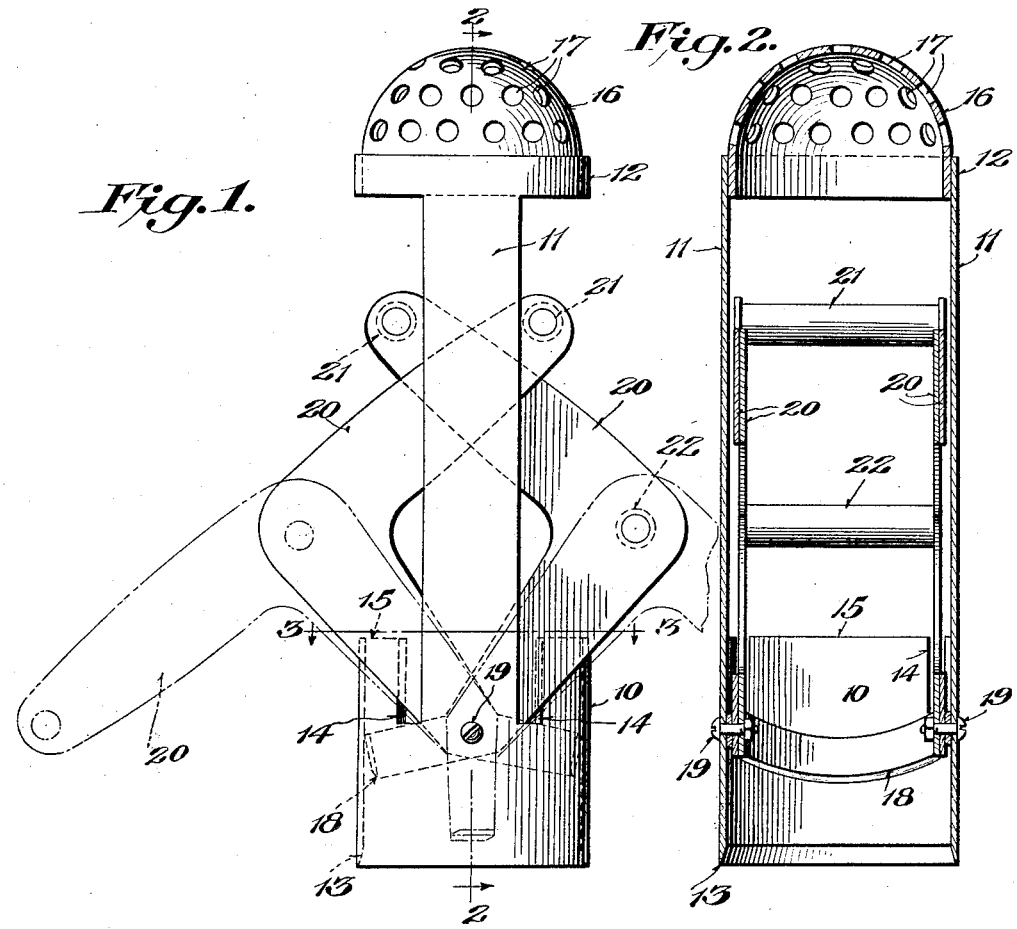
Figure 1 is a side elevation of my improved coring device.
Figure 2 is a sectional view thereof, taken upon line 2—2 of Figure 1.
Figure 3 is a sectional view thereof, the parts in section being taken generally upon line 3—3 of Figure 1.

In the practice of my invention, I employ a tubular cutter 10, having a knife edge 13 at the bottom thereof and provided at its upper end 15 with two open ended slots 14 upon each side thereof for a purpose hereinafter to be described.

Integral with the cutter 10 are the arms 11, joined at their upper ends by the collar 12. Preferably the arms and collar are made of a single piece of tubing but they may be otherwise formed, within the spirit of my invention.

Fixed in the collar 12 is the inverted cup 16, having a plurality of perforations or openings 17 therethrough.

Pivoted to the cutter 10 upon the inside thereof by the screws or pintles 19 or the like, are the companion segmental cutters 18, which are either integral with or permanently attached to the handles 20, connected at their outer free ends by the cross bars 21.

In use, the tubular cutter 10 is placed on the fruit and forced downwardly around the core and seeds with the segmental cutters 18 adjacent to the inner wall and the handles 20 in their closed position, substantially as shown by full lines in the drawings. The handles 20 are then opened or moved upon their pivot mounting until they assume the position substantially as shown by broken lines in Figure 1, at which time they project through the slots 14, and contact with the bottom walls thereof. During this movement, the segmental cutters 18 are moved toward each other below the pivots 19 and sever the core with the seeds therein, adjacent to their inner wall of the fruit skin, all of which are then held within the tubular cutter.

As the device is withdrawn, the core and seeds are removed therewith. The device is then turned upwardly and the core and seeds drop out of the tubular cutter into the inverted cup 16, from which the juices are extracted by pressure applied in any desired manner and escape through the several openings 16. As the device is again returned to its former cutting position the seeds and core drop out.

What I claim as new and desire to secure by Letters Patent, is:

1. A coring device comprising a tubular cutter; lever handles pivotally connected therewith; and segmental cutters connected with said handles and adapted to be moved toward each other by separation of the upper ends of the handles, said segmental cutters during their entire movement being within the tubular cutter.

2. A coring device comprising a tubular cutter; lever handles pivotally connected therewith; segmental cutters connected with said handles and adapted to be moved toward each other by separation of the upper ends of the handles, said segmental cutters during their entire movement being within the tubular cutter; and an inverted cup connected with and opposite the upper end of the tubular cutter.

3. A coring device comprising a tubular cutter; lever handles pivotally connected therewith; segmental cutters connected with said handles and adapted to be moved toward each other by separation of the upper ends of the handles, said segmental cutters during their entire movement being within the tubular cutter; and an inverted cup opposite the upper end of the tubular cutter with an open space therebetween.

4. A coring device comprising a tubular cutter; having arms connected therewith; lever handles pivotally connected therewith; segmental cutters connected with said handles and adapted to be moved toward each other by separation of the upper ends of the handles, said segmental cutters during their entire movement being within the tubular cutter; and a perforated cup fixed to said arms opposite to the tubular cutter.

5. A coring device comprising a tubular member, having a cutter at one end, a collar at the opposite end and arms connecting the cutter and collar; a cup connected with said collar; and segmental cutters pivotally connected with the cutter.

6. A coring device comprising a tubular member, having a cutter at one end, a collar at the opposite end and arms connecting the cutter and collar; a cup connected with said collar; and segmental cutters pivotally connected with the cutter, said segmental cutters being operative entirely within the inside of said cutter.

7. In a coring device; a member having a cylindrical cutter at one end; a ring at its opposite end; arms connecting said ring and cutter, said ring and cutter being of substantially the same diameter and spaced by said arms so as to have an open space therebetween; segmental cutters pivotally mounted within said cutter; and handles connected with said segmental cutters and operative within the open space between said ring and cutter.

In testimony whereof, I have hereunto affixed my signature.

CHARLES H. BOYLE.